No. 613,882. Patented Nov. 8, 1898.
C. M. GREEN.
GENERATING AND DISTRIBUTING ELECTRIC ENERGY.
(Application filed Dec. 23, 1896.)
(No Model.)
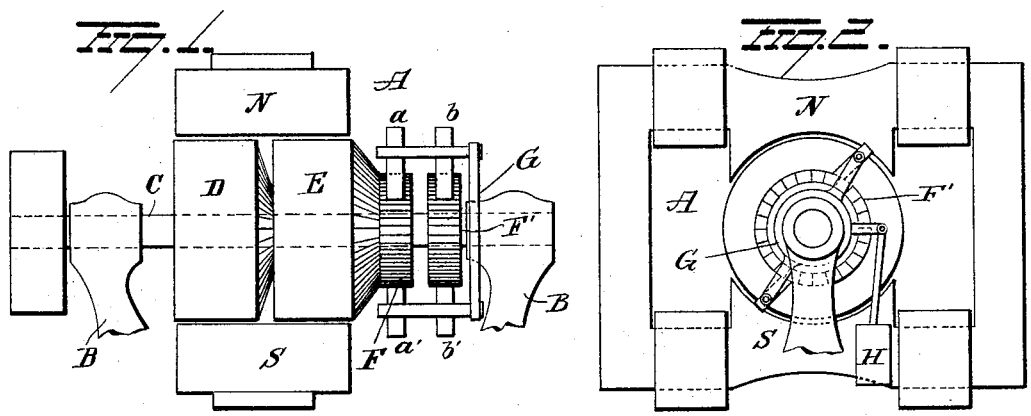
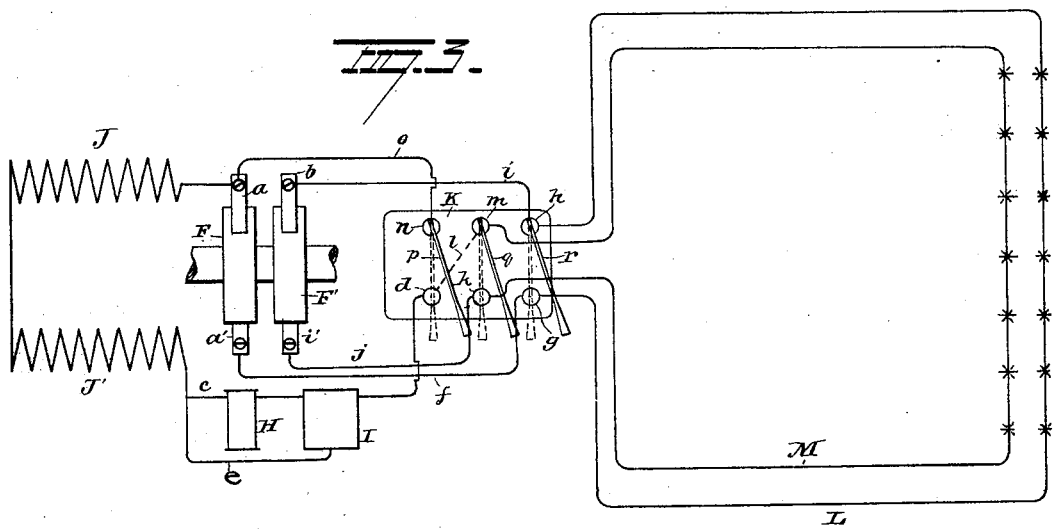
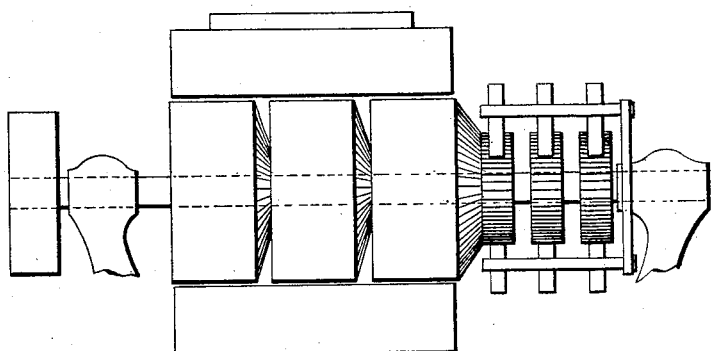
Witnesses
E. J. Nottingham,
G. F. Downing.
Inventor
C. M. Green
By H. A. Seymour
Attorney

UNITED STATES PATENT OFFICE.

CHARLES M. GREEN, OF CLEVELAND, OHIO, ASSIGNOR TO THE GENERAL ELECTRIC COMPANY, OF NEW YORK.

GENERATING AND DISTRIBUTING ELECTRIC ENERGY.

SPECIFICATION forming part of Letters Patent No. 613,882, dated November 8, 1898.

Application filed December 23, 1896. Serial No. 616,765. (No model.)

*To all whom it may concern:*

Be it known that I, CHARLES M. GREEN, a resident of Cleveland, in the county of Cuyahoga and State of Ohio, have invented certain new and useful Improvements in the Generation and Distribution of Electric Energy; and I do hereby declare the following to be a full, clear, and exact description of the invention, such as will enable others skilled in the art to which it appertains to make and use the same.

My invention relates to an improvement in the generation and distribution of electric energy, the object of the invention being to so couple up a dynamo-electric machine having more than a single armature that the total electromotive force generated thereby can be distributed in subdivided circuits the difference in potential between any two points in which or in the machine may be reduced to and maintained at any desired amount, and thus permit the use with safety of dynamo-electric machines capable of generating currents of heavy voltage.

With this object in view the invention consists in generating electromotive force in two or more separate armatures operating between field-magnets common to both or all of them and distributing the electromotive force so generated in separate working circuits having translating devices included therein, said working circuits being connected between and included in series with the separate armatures.

My invention further consists in certain novel features of construction and combinations and arrangements of parts, as hereinafter set forth, and pointed out in the claims, In the accompanying drawings, Figure 1 is a view of a dynamo-electric machine embodying my invention. Fig. 2 is an end view. Fig. 3 is a diagrammatical view. Fig. 4 is a view showing a dynamo with three armatures.

A represents a dynamo-electric machine, N S the field-magnet pole-pieces, and B B standards which constitute bearings for the armature-shaft C. On the shaft C two or more armatures D E are secured and adapted to rotate in a field common to both.

The form and construction of the armatures are not important. They may be of any desired type and may be either open or closed coil armatures; but in all cases two or more are mounted to operate between field-magnets common to both or all of them.

Commutator-rings F F' are secured to the armature-shaft and in all cases correspond in number with the armatures employed in a particular machine. With each commutator-ring a pair of commutator-brushes $a\ a'\ b\ b'$ make contact, said brushes being mounted in a suitable yoke G, which latter is connected with an automatic regulator H, that serves to shift the brushes and automatically vary and regulate the output of electromotive force to correspond to the work or resistance that may be included in the external or working circuits. A "wall-regulator" I may also be employed to automatically shunt some of the current around the regulator H. I have not deemed it necessary to illustrate or describe in detail the construction or mode of operation of said regulators H I, because such devices are well known and any preferred form may be employed.

External or working circuits corresponding in number with that of the armatures are employed and are so arranged that they will be connected between and included in series with the armatures and their commutators. In the diagrammatical view, Fig. 3, the commutator-brush $a$ is shown connected with one end of the field-magnet coil J, and the end of the other field-magnet coil J' is connected by a conductor $c$ and through the regulators H I with a contact-post $d$ of a switchboard K. A shunt-circuit $e$ extends from the wall-regulator I around the main regulator H.

The commutator-brush $a'$ is connected by a conductor $f$ with a contact-post $g$ of the switchboard, and another contact-post $h$ is connected by a wire $i$ with the commutator-brush $b$. The brush $b'$ is connected by a conductor $j$ with a contact-post $k$ of the switchboard. The contact-post $d$ is connected by a conductor $l$ with a contact-post $m$. Another contact-post $n$ is connected by a conductor $o$ with the commutator-brush $a$. The contact-posts of the switchboard are arranged in pairs, and the posts of each pair are adapted to be bridged by switch-arms $p\ q\ r$. The terminals of one external circuit L are connected with the contact-posts $g$ $h$ of the switchboard, and the terminals of the other external circuit M are connected with the contact-posts $k$ $m$. From this construction it is apparent that when all the switches are open the two external circuits will be in series with each other and with the two armatures of the dynamo-electric machine. By means of the switch-arms $q$ $r$ the working circuits may be short-circuited, and by means of the switch-arm $p$ the machine can be rendered inactive by short-circuiting the field-magnet coils.

With all the switches open the circuits may be traced as follows: Beginning with the commutator-brush $a$, through armature D and its commutator F to brush $a$, then by conductor $f$ to post $g$ of the switchboard, then through external circuit L to post $h$, then by conductor $i$ to brush $b$, then through armature E and its commutator F' to brush $b'$, then by conductor $j$ to post $k$ of the switchboard, then through the external circuit M to contact-post $m$, then by conductor $l$ to post $d$, then by conductor $c$ through the regulators H I and to one end of field-magnet coil J', then to other field-magnet coil J', and from the latter to the commutator-brush $a$. Thus all the electromotive force generated in the armature D will flow through the external circuit L and translating devices included therein, and all the electromotive force generated in the armature E will flow through the external circuit M and the translating devices included in that circuit.

When it is desired to render the machine inactive, the switch-arm $p$ will be made to connect posts $d$ $n$, whereupon the field-magnet coils will be short-circuited through the conductor $o$.

It is apparent that my invention is applicable with dynamos having three or more separate armatures, in which case three or more commutators and a corresponding number of external circuits will be employed.

In each external circuit translating devices are included, and for sake of illustration it may be assumed that in each circuit there are included forty arc-lamps of fifty volts each, so that the load of each external circuit will nearly balance the electromotive force generated in each one of the armatures of the dynamo-electric machine, the total capacity of the dynamo shown in the drawings being assumed to be between four thousand and five thousand volts. The above conditions are desirable in practice, but they are not essential, since any one or more of the circuits may be cut out or any number of the lamps in either one of the circuits may be cut out, in which case the automatic regulator will operate to cut down the total output of electromotive force generated by the several armatures to correspond to and operate the remaining lamps in circuit.

It is of course understood that the figures above given are for the purpose of illustration merely, although in fact they closely approximate the conditions that exist in actual practice, and that in practice the machine will have a capacity for generating an amount of electromotive force somewhat in excess of the amount expended in operating the lamps or other translating devices in the external circuits. It will be found that the difference of potential between any two points on the machine or in the external circuits will but slightly exceed two thousand volts, notwithstanding that the machine shown in the drawings is capable of generating a total electromotive force of four thousand volts or more.

In this patent I do not broadly claim a system of electric generation and distribution consisting of generating electromotive force in two or more sets or groups or armature-coils and distributing the electromotive force so generated in separate external circuits and connected between and included in series with such separate groups of armature-conductors, such invention being covered, broadly, by claims in my pending application, Serial No. 588,108, and is reserved to be protected by the patent granted thereon. The invention disclosed and claimed in this patent relates to a specific embodiment of the invention disclosed and broadly claimed in my pending application and is not shown or described therein. It consists in a dynamo provided with two or more separate and distinct armatures having a field common to both and separate external circuits connected between and included in series with such separate armatures, whereby the total electromotive force generated by the two or more armatures will be distributed to the separate external circuits, and thereby serve to reduce the electromotive force between any two points on any of the external circuits or on the machine to the maximum potential required to operate the maximum work that may be included in either one of such external circuits.

Having fully described my invention, what I claim as new, and desire to secure by Letters Patent, is—

1. A method of current generation and distribution which consists in generating electromotive force in two or more separate armatures operating in fields common to both or all of them, and distributing the electromotive force so generated in separate working circuits having translating devices included therein, said working circuits being connected between and included in series with the separate armatures.

2. A system for the generation and distribution of electric current, which comprises a dynamo having two or more armatures and a common field, a commutator for each armature, and working circuits corresponding to the number of armatures, each of which working circuits is electrically connected at one end with the positive side of one commutator and at its opposite end with the negative side of another commutator, the several armatures, commutators and working circuits being connected in series with each other, substantially as set forth.

3. The combination with a dynamo having a series of separate armatures, of a series of external circuits corresponding with the number of armatures, said external circuits being arranged in series with the armatures and in series with each other, substantially as set forth.

4. The combination with a dynamo having a series of separate armatures, of a commutator for each armature, a series of external circuits corresponding to the number of armatures, said external circuits each having one end connected to a brush of one commutator and its other end connected with a brush of another commutator, substantially as set forth.

5. The combination with a dynamo having a series of separate armatures and a commutator for each armature, of external circuits corresponding in number with that of the armatures, said armatures and external circuits being all connected in series with each other and switches for cutting out any one of said external circuits, substantially as set forth.

6. The combination in a dynamo-electric machine, of two or more armatures, a field-magnet common to the armatures, two or more working circuits, each interposed between and included in series with the armatures, and an automatic regulator for varying the electromotive force of the current generated to correspond with load interposed in said working circuits, substantially as set forth.

7. The combination with two or more armatures of two or more external circuits having translating devices included therein, each circuit being interposed between and connected in series with the separate armatures, substantially as set forth.

In testimony whereof I have signed this specification in the presence of two subscribing witnesses.

CHARLES M. GREEN.

Witnesses:
S. M. HAMILL,
J. R. PRENTISS.